United States Patent [19]

Livingston et al.

[11] Patent Number: 5,033,693

[45] Date of Patent: Jul. 23, 1991

[54] SINGLE-PIECE, FLEXIBLE INLET RAMP

[75] Inventors: David E. Livingston, Huntsville, Ala.; Thomas J. Kornell, Federal Way, Wash.

[73] Assignee: The Boeing Company, Seattle, Wash.

[21] Appl. No.: 285,055

[22] Filed: Dec. 14, 1988

[51] Int. Cl.⁵ .................................. B64D 33/02
[52] U.S. Cl. .......................... 244/53 B; 137/15.1; 244/219
[58] Field of Search .............. 244/53 B, 12.5, 219, 244/123, 52, 3.22; 239/265.19, 265.33, 265.35, 265.37, 265.43, 513, 516, 602; 52/801; 428/603, 593; 60/230–232; 137/15.1, 15.2

[56] References Cited

U.S. PATENT DOCUMENTS

| | | | |
|---|---|---|---|
| 2,429,144 | 10/1947 | Watter | 244/123 |
| 2,939,651 | 6/1960 | Kaplan et al. | 244/53 B |
| 2,997,843 | 8/1961 | Arnett et al. | |
| 3,066,892 | 12/1962 | Smith et al. | |
| 3,104,522 | 9/1963 | Pennington et al. | |
| 3,179,357 | 4/1965 | Lyon | 244/219 |
| 3,265,331 | 8/1966 | Miles | |
| 3,295,555 | 1/1967 | James et al. | |
| 3,338,049 | 8/1967 | Fernberger | |
| 3,443,598 | 5/1969 | Pierce | |
| 3,450,141 | 6/1969 | Braendlein | |
| 3,456,664 | 7/1969 | Foote | |
| 3,765,179 | 10/1973 | Strang et al. | |
| 3,941,336 | 3/1976 | Nagia | |
| 3,954,230 | 5/1976 | Machota | 244/12.5 |
| 4,247,066 | 1/1981 | Frost et al. | 244/219 |
| 4,252,287 | 2/1981 | Zimmer | 244/219 |
| 4,307,743 | 12/1981 | Dunn | |
| 4,372,505 | 2/1983 | Syberg | |
| 4,463,772 | 8/1984 | Ball | 244/53 B |
| 4,620,679 | 11/1986 | Karanian | |

FOREIGN PATENT DOCUMENTS

| | | | |
|---|---|---|---|
| 1217955 | 5/1960 | France | |
| 899625 | 7/1962 | United Kingdom | |
| 1107635 | 3/1968 | United Kingdom | 239/265.43 |
| 1190812 | 5/1970 | United Kingdom | |
| 1438769 | 6/1976 | United Kingdom | |

Primary Examiner—Galen Barefoot
Attorney, Agent, or Firm—Seed and Berry

[57] ABSTRACT

An inlet having a single-piece, flexible inlet ramp skin is disclosed. A corrugated member is rigidly coupled to the interior surface of the ramp skin to hold the skin rigid in one direction but permit it to be extremely flexible in a second direction. A plurality of beams extend perpendicular to the ridges and grooves of the corrugated member to hold the skin in position in the second direction. Mechanical actuators are coupled to the beams for applying force to vary the shape of the beams and thus the shape of the ramp skin. The inlet area is varied as the ramp skin is moved. The beam member and ramp skin are elastically deformable from an intermediate position in a first direction to increase the area of the inlet and in a second direction to decrease the area of the inlet. Shaping the beam and ramp skin to be at an intermediate position when not deformed permits a greater range of movement and a more variable inlet area for a given material and weight.

25 Claims, 9 Drawing Sheets

SINGLE-PIECE, FLEXIBLE INLET RAMP

DESCRIPTION

1. Field of the Invention

This invention relates to an inlet ramp for an aircraft engine, and more particularly, to an inlet ramp including a single-piece, flexible inlet skin member and mechanical actuators to vary the shape of the inlet ramp and area of the inlet to an aircraft engine.

2. Background of the Invention

Proposals have recently been made to produce an earth orbiting spacecraft whose main engines are air-breathing engines and having the aerodynamic properties of an aircraft. According to the proposal, the aircraft takes off from an airstrip on the earth in a manner similar to current aircraft. The aircraft operates on fuel which is readily combustible in the atmosphere surrounding the earth. The aircraft builds up sufficient speed in the earth's atmosphere that when the fuel is expended, the aircraft coasts into a desired orbit around the earth. The aircraft must attain speeds in the range of Mach 25 while in the earth's atmosphere in order to have sufficient speed to coast into an outer space orbit. Significant cost savings are realized by using ambient air as the desired combustion environment lo place payload into orbit. The total take-off weight is significantly decreased by not having to carry oxygen as part of the aircraft load. Further, significant cost savings are realized by not having to purchase, store, and carry the oxygen used in the combustion of the fuel.

The air requirements for the aircraft's engines will vary considerably, depending upon the speed of the aircraft and the thrust developed by the engines. The airflow through the inlet must be varied according to the air requirements of the engine to minimize the drag. Generally, the higher the maximum operating speed of an aircraft, the more variable the inlet area must be to accommodate greater variations in the air intake requirements of the engines.

Current techniques for varying the area of the inlet are not suitable for use in an aircraft traveling from takeoff speeds to speeds above Mach 25. One current technique is to move a plurality of ramps which are pivotally coupled together to vary the inlet area. As the operating speed of the aircraft increases, more ramps must be added. Aerodynamic heating, drag, complexity of operation and the number of exposed joints generally increase when additional ramps are added. Significant weight is also added by the plurality of ramps having respective hinges, actuators, couplings, etc. Another current technique is to move a conical spike within a conical inlet, to vary the inlet area. The structure required to move the spike adds significant weight and complexity to the inlet operation.

DISCLOSURE OF THE INVENTION

It is therefore an object of the present invention to provide an inlet whose area is variable over a wide range.

It is another object of this invention to provide an inlet ramp that is variable over a wide range of shapes without requiring additional hinges and aerodynamic seals.

It is another object of this invention to provide an aircraft inlet ramp that is light in weight, but is held sufficiently rigid that the shape is maintained even though speeds in excess of Mach 25 are encountered.

These and other objects of the invention are accomplished by providing an inlet ramp having a single-piece, inlet ramp skin. Use of a single ramp skin minimizes the number of aerodynamic seals required on the hinges, which create local hot spots in a high-speed aircraft. A corrugated member is rigidly coupled to the interior surface of the ramp skin to hold the shape of the ramp skin rigid in one direction but permit the ramp skin to be extremely flexible in the second direction. A plurality of beams extend perpendicular to the ridges and grooves of the corrugated member to hold the skin in position in the second direction. Mechanical actuators are coupled to the beam members for applying force to vary the shape of the beams and thus the shape of the ramp skin. Moving the beams also varies the inlet area. Aerodynamic local heating, drag, weight, number of hinges and complexity of operation are reduced by use of a single-piece inlet ramp skin.

The beam member, corrugated member and ramp skin surface are formed with a shape corresponding to an intermediate position of the ramp. The beam member and ramp are elastically deformable in a first direction to increase the area of the inlet and are elastically deformable in a second direction to decrease the area of the inlet. Shaping the beam and ramp skin to be at an intermediate position when not deformed permits a greater range of movement of these members and the inlet area to be more variable for a given material and weight.

BRIEF DESCRIPTION OF THE DRAWINGS

FIG. 5 is a cross-sectional view taken along lines 5—5 of FIG. 4 showing the corrugated member coupled to the ramp skin member, with the ramp in an intermediate position.

DETAILED DESCRIPTION OF THE INVENTION

Figure 1:
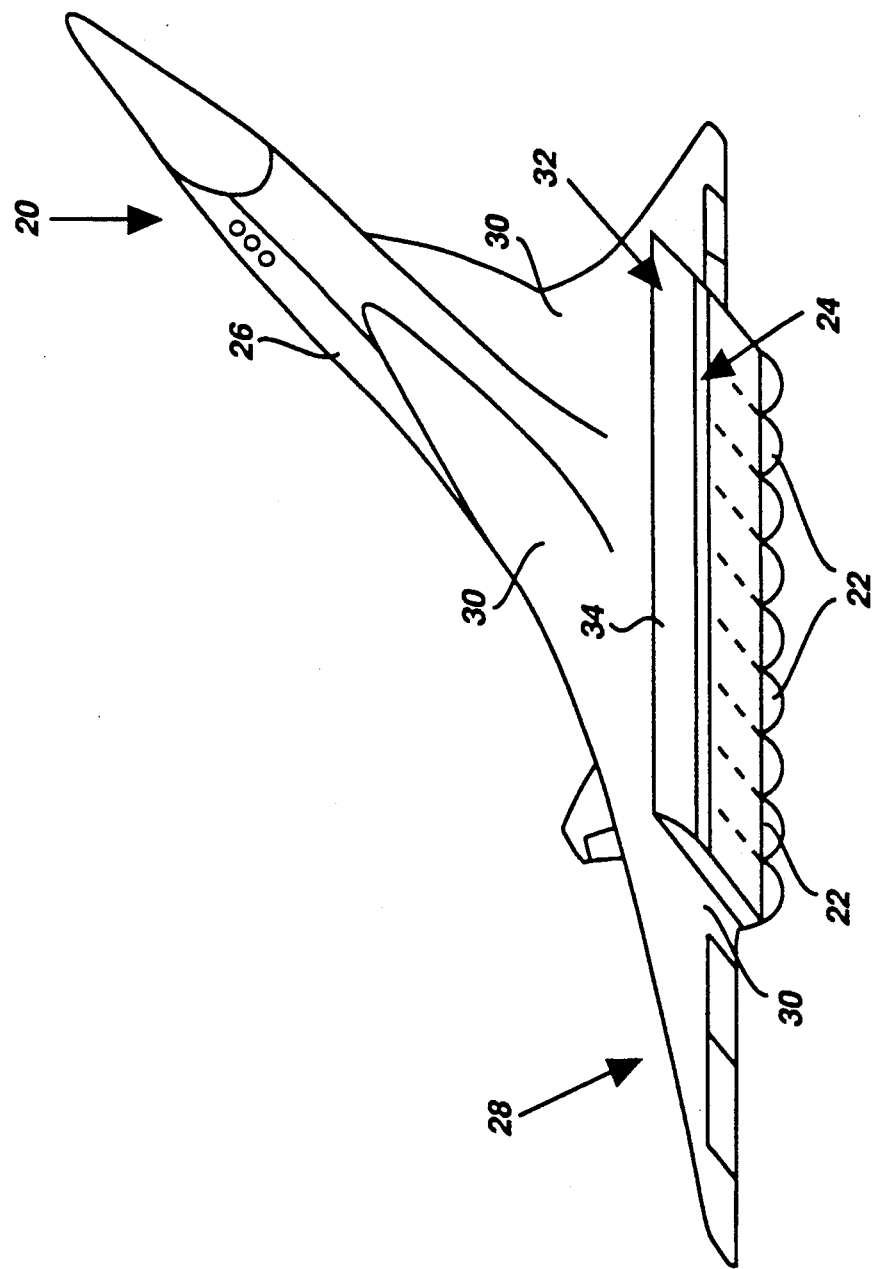
FIG. 1 is an isometric view of an aircraft incorporating the invention.

An aircraft 20 designed for taking off from the ground and flying into outer space using air-breathing engines is illustrated in FIG. 1. A plurality of engines 22 power the aircraft using fuel from fuel tank 26. The type of fuel held in fuel tank 26 is combustible in the presence of air located in the atmosphere surrounding the earth. Air enters the engines through inlet 24 as the aircraft flies, for combustion with the fuel.

The aircraft 20 also includes a wing member 28 having a lower wing skin surface 30. An inlet ramp assembly 32 having a skin member 34, extends along the underside of the aircraft. The ramp assembly 32 is movable to a variety of positions to vary the area of the inlet 24. The shape of the skin member 34 is also variable to channel the air entering the inlet in a desired flow pattern and at desired speeds.

The aircraft 20 of FIG. 1 is designed to take off from the earth and attain orbital speeds while flying in the earth's atmosphere. According to the proposed design, the aircraft 20 builds up speed towards a desired orbital speed while in the earth's atmosphere. Upon attaining the desired speed, the aircraft's guidance system directs the aircraft 20 on a trajectory to place it in a desired orbit around the earth. All of the aircraft's main fuel is consumed just prior to the aircraft's leaving the earth's atmosphere and entering an orbit above which the atmosphere exists. The speed which the aircraft 20 must attain is in the range of Mach 22-30. Significant heating due to air friction will occur on the aircraft surfaces, particularly at hinges, rivets and the like, while traveling at these high speeds in the earth's atmosphere. It is desirable to minimize the heating the aircraft structure caused by air friction. It is also desirable to minimize the drag caused by various surfaces as the aircraft 20 flies through the air in building up to the high speeds prior to entering the earth's orbit.

The main function of the ramp is to provide the correct amount of compression of the flow entering the inlet to cause the flow to be at the proper velocity and at a selected pressure. The proper velocity of the flow varies with the speed of the aircraft. Because the speed varies over a wide range, the ramp must be variable over a large range of shapes and inlet areas to satisfy the engine airflow, compression and performance requirements over the entire speed range.

Figure 3:
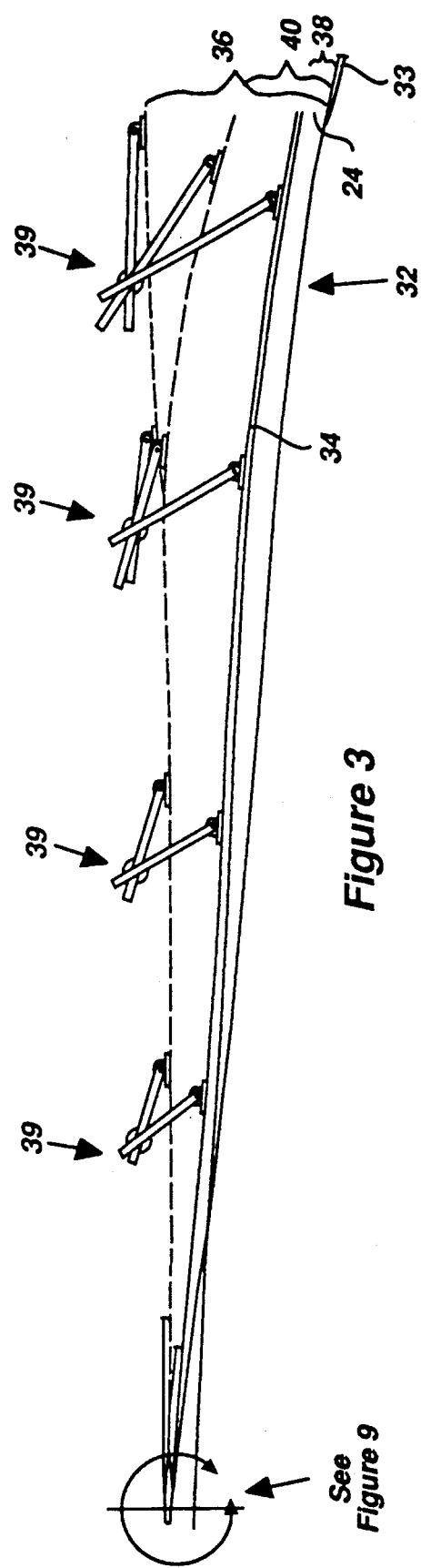
FIG. 3 is a partial cross-sectional view of the inlet ramp in various positions.

As shown in FIG. 3, the inlet includes a single-piece, flexible skin member 34 and an inlet lip 33. Preferably, the ramp skin member 34 is an integral, single-piece member that is coupled to the remainder of the ramp assembly 32 by welding, brazing or the like along the interior surface so that no hinges, joints, bolt heads or the like extend out of the exterior surface and into the air flow. Use of a flexible ramp with few or no hinges permits the ramp to remain at low temperatures when the aircraft is traveling at high speeds. Aerodynamic seals that would otherwise be necessary on a jointed inlet ramp are eliminated or minimized by using a single-piece, flexible skin member.

Figure 11:
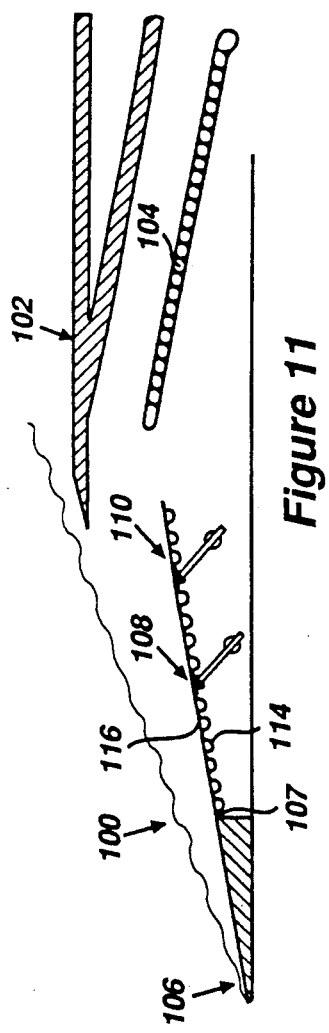
FIG. 11 is a cross-sectional view of the flexible inlet ramp in an alternative inlet.

Alternatively, as shown in FIG. 11, the ramp assembly 32 includes one or more integral, single-piece, flexible members 108 coupled by hinges to other inlet ramps 106, 110, along the outside surface. In the alternative embodiment of FIGS. 11 and 12, a plurality of inlet ramps 106, 108 and 110, have respective ramp skin members 118, 120 and 122. Skin member 120 of ramp 108 is flexible and but skin members 118 and 122 of ramps 106 and 110 are not flexible.

Figure 2:
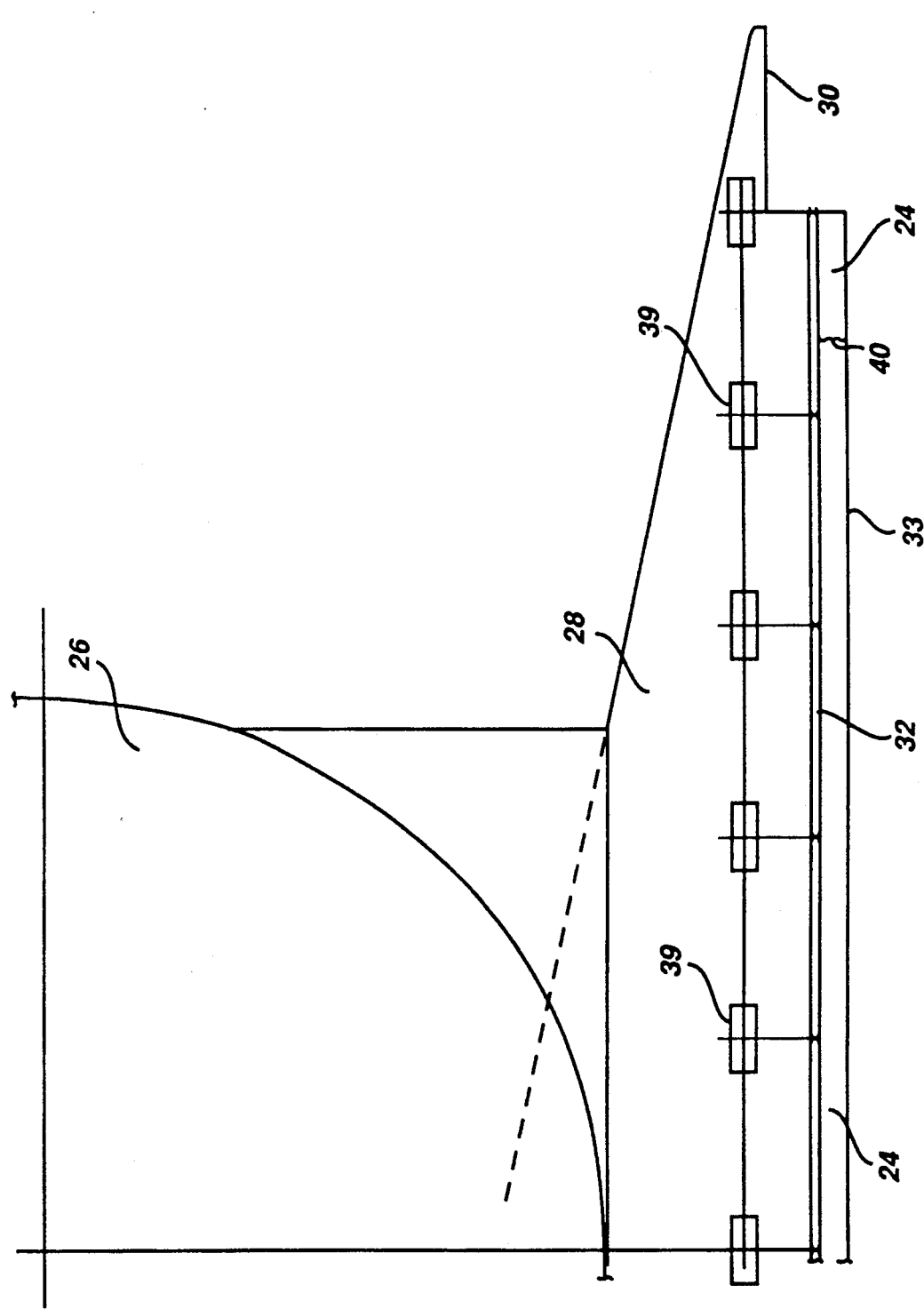
FIG. 2 is a partial cross-sectional view of the inlet to the engines showing the ramp in an intermediate position.

As shown in FIGS. 2 and 3, the ramp assembly 32 is movable by ramp actuators 39 to provide a maximum inlet area 36, a minimum inlet area 38, or any selected inlet area therebetween. When the ramp assembly 32 is not deformed, it is at an intermediate position providing an intermediate inlet area 40. When the ramp assembly 32 is not deformed, there are no internal stresses on the ramp assembly. When the ramp assembly 32 is deformed, either towards a maximum or minimum inlet area, internal stress are placed on the ramp assembly structure.

Figure 4:
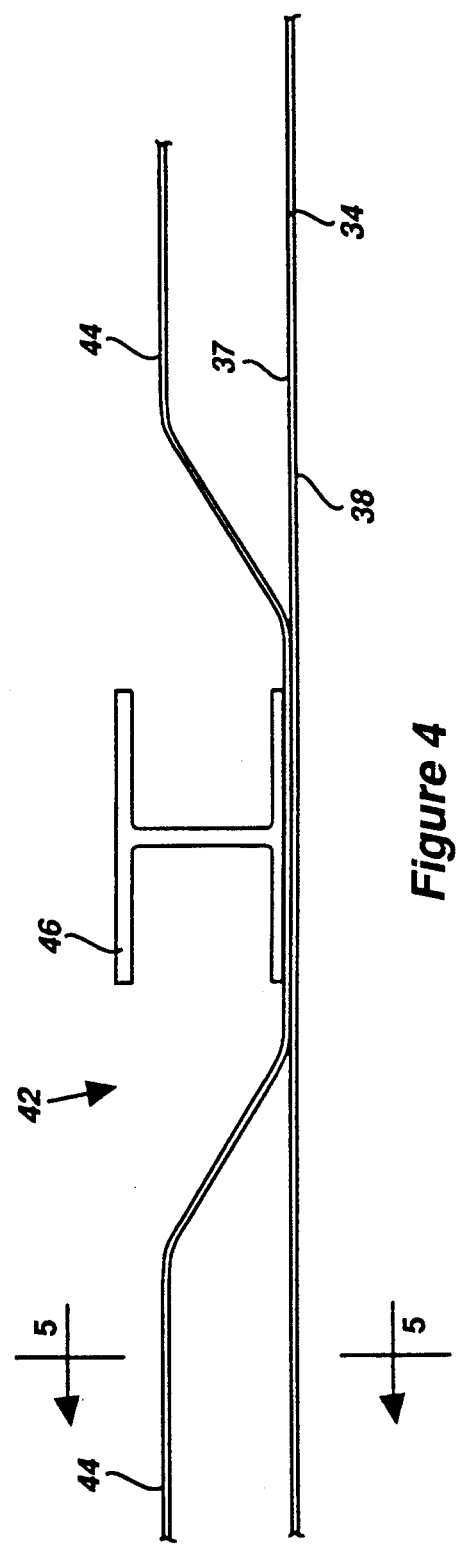
FIG. 4 is a cross-sectional view of the ramp skin member, beam member, and corrugated support member.
Figure 5A:
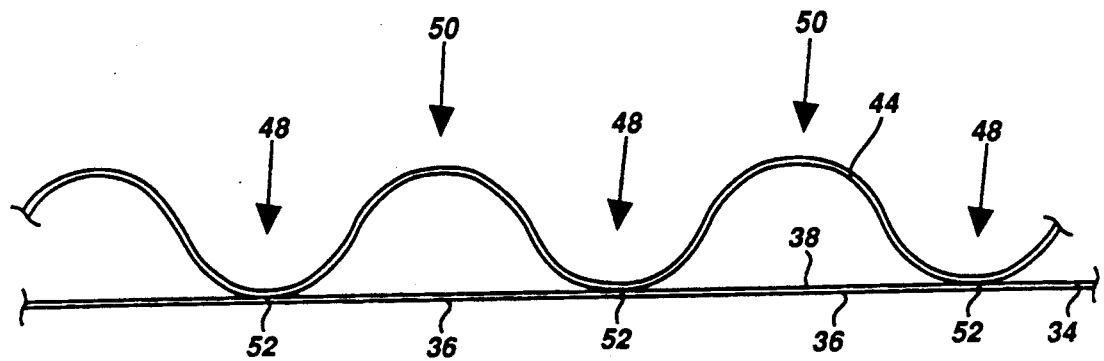
FIG. 5a is a cross-sectional view of the skin with the ramp in the intermediate position.

As shown in FIGS. 4 and 5, the ramp assembly 32 includes a skin member 34 having an interior surface 36 and an exterior surface 38. The skin member 34 is a single integral member. The skin outer surface 38 is smooth and continuous along the entire face thereof. The skin member 34 is a continuous piece having no hinges, vents, bolts, or the like extending into the airflow, as is shown in FIG. 3. The skin member 34 is sufficiently thin that it may be flexed, that is, elastically deformed, to a variety of positions. The skin member 34 is made of a high strength, high fatigue strength, elastically deformable material having the ability to withstand high temperatures. Alloys of titanium, stainless steel, metallic-ceramic compositions and the like are suitable materials for ramp skin member 34.

The ramp assembly 32 is subject to internal and external stresses. The deforming of the ramp assembly 32 places internal stress on the ramp assembly. The stress may be on the skin 34, the corrugated members 44, the beam members 46, and the like. Additional internal stresses may be placed on certain portions of the ramp assembly 32 by localized deformation, which provides a desired airflow pattern at particular speeds. Flying through the atmosphere places external stress on the ramp assembly 32. The external stresses caused by the airflow depend on many factors, such as, the shape of the inlet ramp, the inlet area, the aircraft's speed, the air density, and the like. The external stress on various portions of the aircraft will also be altered by localized deformation, which may be done to create a desired airflow pattern at various speeds. The to al stress on the ramp assembly 32 is a combination of the internal stresses from being deformed and the external stresses exerted by the airflow on the ramp assembly 32 as the aircraft 20 flies through the air.

The ramp structure is designed to have sufficient strength to withstand the combination of the internal stresses caused by deforming the ramp and the external stresses exerted on the aircraft at any time during flight. When the ramp assembly 32 is at intermediate position 40 during flight, the ramp assembly is not deformed and there are minimum internal stresses on the ramp assembly 32. However, there are significant external stresses exerted on the ramp assembly 32 in this position by the airflow as the aircraft flies through the air. Deforming the ramp assembly 32 upward toward position 36 increases the internal stress. The external stresses when the ramp is at the maximum inlet area position 36 will likelY be less than at the intermediate or minimum position, but may be more, depending on a variety of flight parameters. Deforming the ramp assembly downward, towards position 38 also places internal stresses on the ramp assembly 32. When the inlet area is a minimum value 38 the ramp assembly 32 is at its greatest angle with respect to the airflow. The external stresses are increased somewhat due to the increased angle of the ramp assembly 32 with respect to the air. The intermediate position 40 is selected to be a position such that the total stress on the ramp assembly, while in flight, at either the maximum area position 36 or the minimum area position 38 will be relatively equal. The intermediate position 40 may be somewhat closer to the minimum inlet area position 38 because the external stresses will be much greater at the minimum position 38 then at the maximum inlet area position 36.

Advantages are achieved by forming the ramp assembly 32 to a shape of an intermediate position 40 when not deformed. For example, the ramp assembly 32 requires less absolute movement to position the ramp assembly in either the maximum or minimum inlet area positions. A further advantage is that significantly less overall stress is placed on the ramp assembly 32 over the operating range of the ramp assembly than would be placed on it if it were formed having a shape at a maximum air inlet position and was deformed to a minimum air inlet position, or vice versa. Because less internal stress will exist, a ramp assembly 32 having sufficient strength for the entire range of operation may be made lighter in weight than would otherwise be possible.

The ramp assembly 32 includes a plurality of mechanical actuators 39 for moving the ramp skin lo any desired position and having a desired shape. The ramp actuators are aligned in columns and rows, but may be otherwise organized depending on the size and shape to be attained by the ramp. In the preferred embodiment, there are 44 actuators formed in eleven columns and four rows, as shown in FIGS. 2 and 3. The ramp actuators 39 may be independently driven in a conventional manner to permit the ramp skin member 34 to attain any desired shape. The positions of the ramp actuators 39 are coordinated with each other to ensure that the skin member 34 has a desired shape along its entire contour. Preferably, all actuators 39 in a row are driven by a common motor and on a common drive shaft. The ramp skin member 34 is shaped to provide efficient airflow into the inlet 24 under the current flying conditions. The shape of the ramp skin 34 is varied as the flight conditions change.

The ramp skin member 34 is reinforced along the interior surface 37 thereof by corrugated member 44 and beams 46, as shown in FIGS. 4 and 5. The corrugated member 44 extends under beam member 46, as shown in FIG. 4. Corrugated member 44 includes grooves 48 and ridges 50. The corrugated member 44 is solidly coupled to the skin member 34 on the interior surface 37 at the bottom portion 52 of each of the grooves 48 by welding, brazing or the like, in a manner to ensure that no fasteners extend into the air flow on the exterior surface 35. The remaining portions of the corrugated member 44 are free standing, the ridges 50 and other portions of the corrugated member not being coupled to any other structure. The ridges 50 and grooves 48 extend across the width of the ramp skin 34 and effectively act as support beams in the direction parallel to the extending of the ridges and grooves. The ridges 50 and grooves 48 run perpendicular to the beams 46. The shape and size of the grooves 48 and ridges 50 is selected based on the range of movement of ramp skin 34.

Figure 5B:
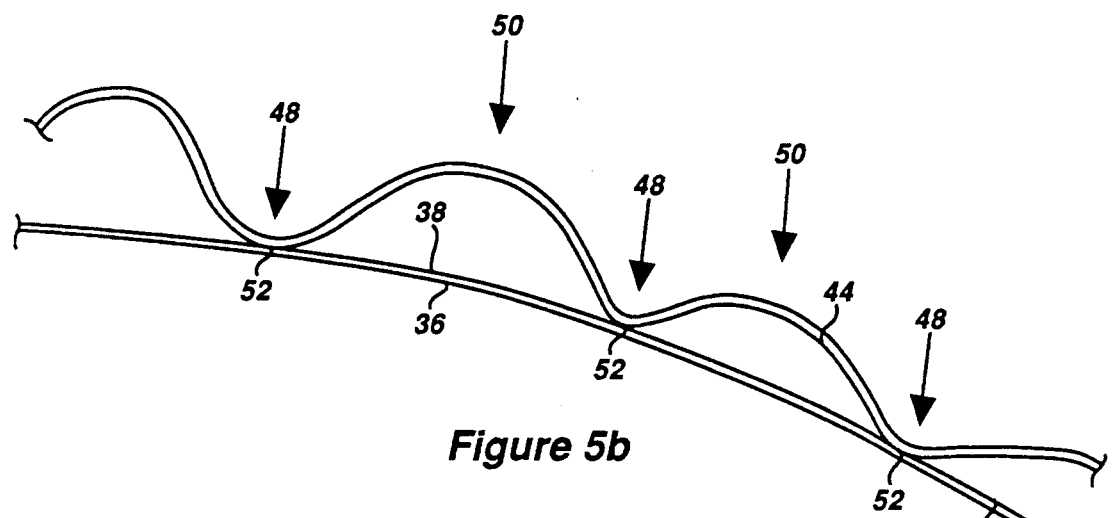
FIG. 5b is a cross-sectional view of the skin with the ramp deformed toward a minimum inlet area position.
Figure 5C:
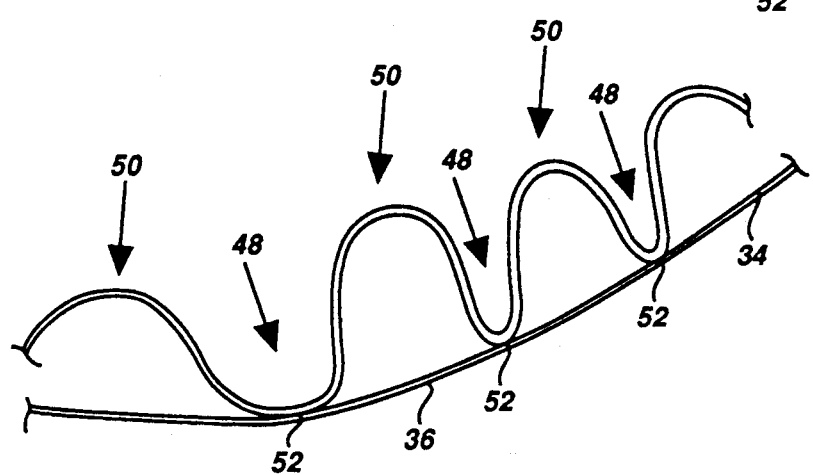
FIG. 5c is a cross-sectional view of the skin with the ramp deformed toward a maximum inlet area position.

Use of a corrugated member coupled only at the grooves 48 for reinforcement along an interior surface 37 of the skin member 34 provides significant advantages. Use of a corrugated reinforcement member 44 on the interior surface 38, coupled only at the grooves 48 thereof to the skin member 34 permits the skin member to be extremely flexible and deformable in one direction and extremely rigid, having many support beams in the form of ridges 50 and grooves 48, in the other direction. The corrugated member 44 provides support to ensure that the skin 34 has a desired shape along its width, between beam members 46. Use of corrugated member 44 also permits flexibility in the dimension perpendicular to the grooves 48 and ridges 50. The skin member 34 may be flexed downward or upward, as shown in FIGS. 5b and 5c. The movement in FIGS. 5b and 5c is exaggerated to illustrate the relationship between the skin member 34 and the corrugated member 44. When the skin member 34 is deformed downward, the corrugated member 44 remains coupled at each groove 48 to the same location 52 on the skin 34. The ridge portion 50 flattens to accommodate the difference in relationship between the points 52 as the skin member 34 is deformed. Ridges 50 remain and provide stiffening support, even when the skin member 34 is deformed downward, though their height is less. When the skin 34 is flexed or deformed upward with respect to the intermediate position 40, the ridges of the corrugated material 44 rise to accommodate for the new relationship between the points 52.

Figure 10:
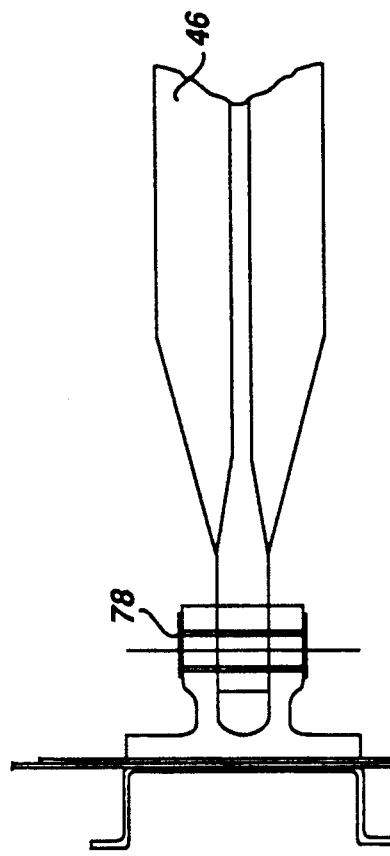
FIG. 10 is a cross-sectional view taken along lines 10—10 of FIG. 9.
Figure 9:
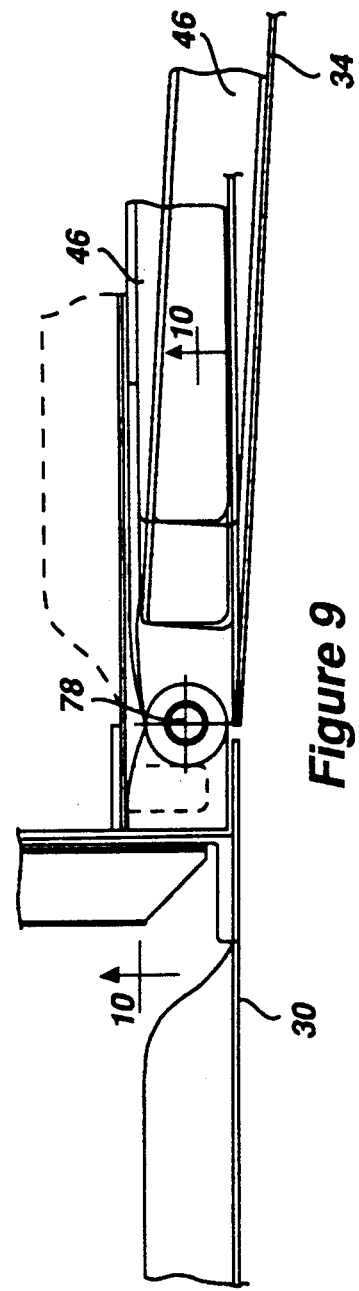
FIG. 9 is a side elevational view of the beam coupling to the aircraft frame.

The beam members 46 are made sufficiently strong to withstand the stress from external forces during the flying due to airflow across the surface of the skin member 34 and yet be sufficiently flexible to be elastically deformable the distance required to provide the required variation in inlet area 24 and surface shapes. The beam 46 is pivotally coupled through a hinge fitting 78 in the forward portion of the wing structure at a bottom region, as shown in FIGS. 9 and 10. The pivoting hinge 78 permits the beam 46 to pivot at a forward position as the inlet area is increased or decreased. Alternatively, the beam 46 may be an integral structural beam from the aircraft 20 extending to the ramp assembly without a hinge coupling. Forming the beam members 46 in an intermediate position such that the full range of motion is provided by deforming the beams 46 approximately a uniform distance in both an upward and downward direction significantly lowers the required movement of the beam 46 and thus permits a less flexible material to be used than would otherwise be possible.

The skin member 34 is separated from the wing skin member 30, as shown in FIG. 9. A bridging material may be placed therebetween to improve the aerodynamic properties. Alternatively, the skin member 34 may be a continuation of wing skin member 30 or some other ramp skin member.

Figure 6:
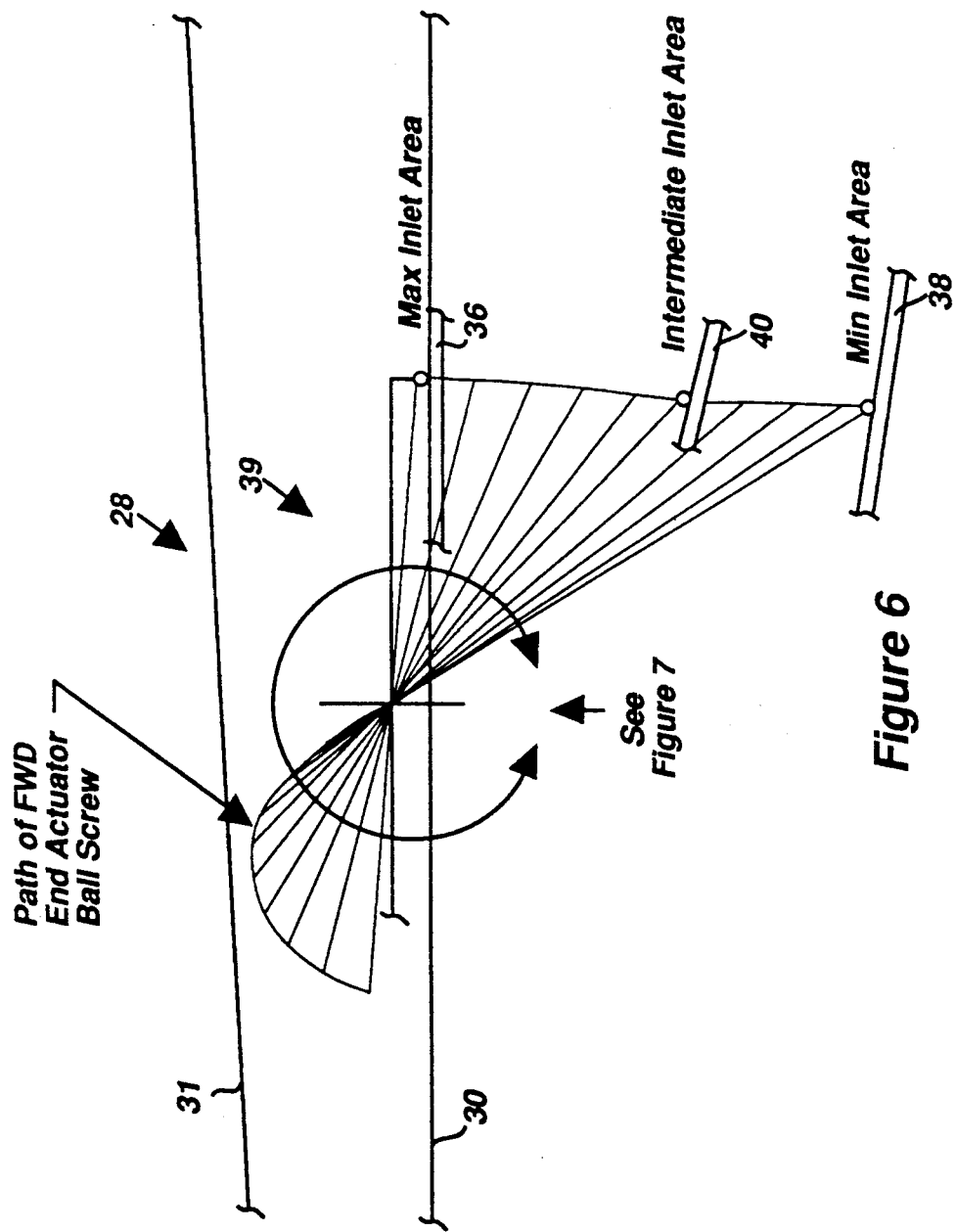
FIG. 6 is a side elevational view of the path followed by the ramp actuator.
Figure 7:
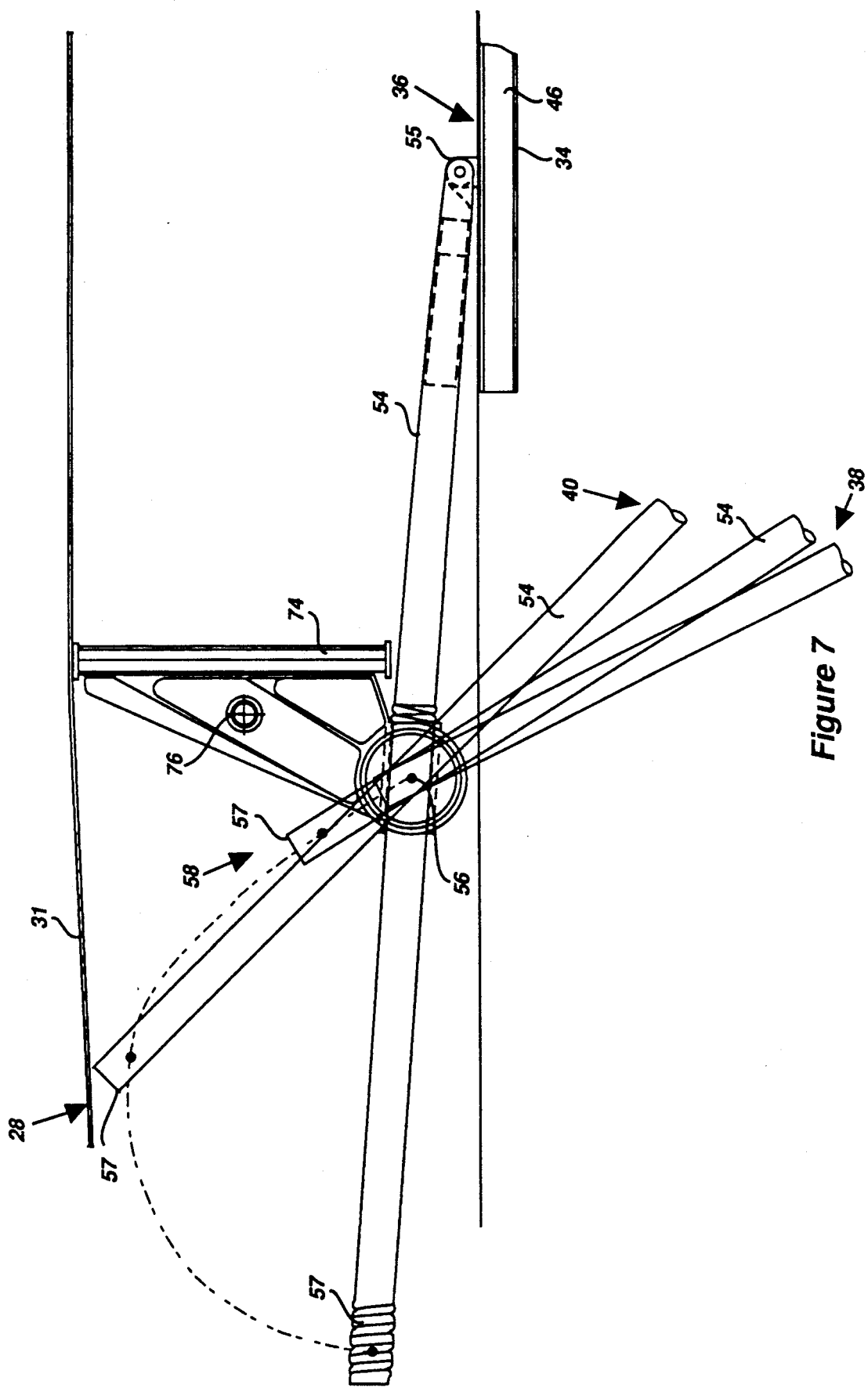
FIG. 7 is a top plan view of the ramp actuator.
Figure 8:
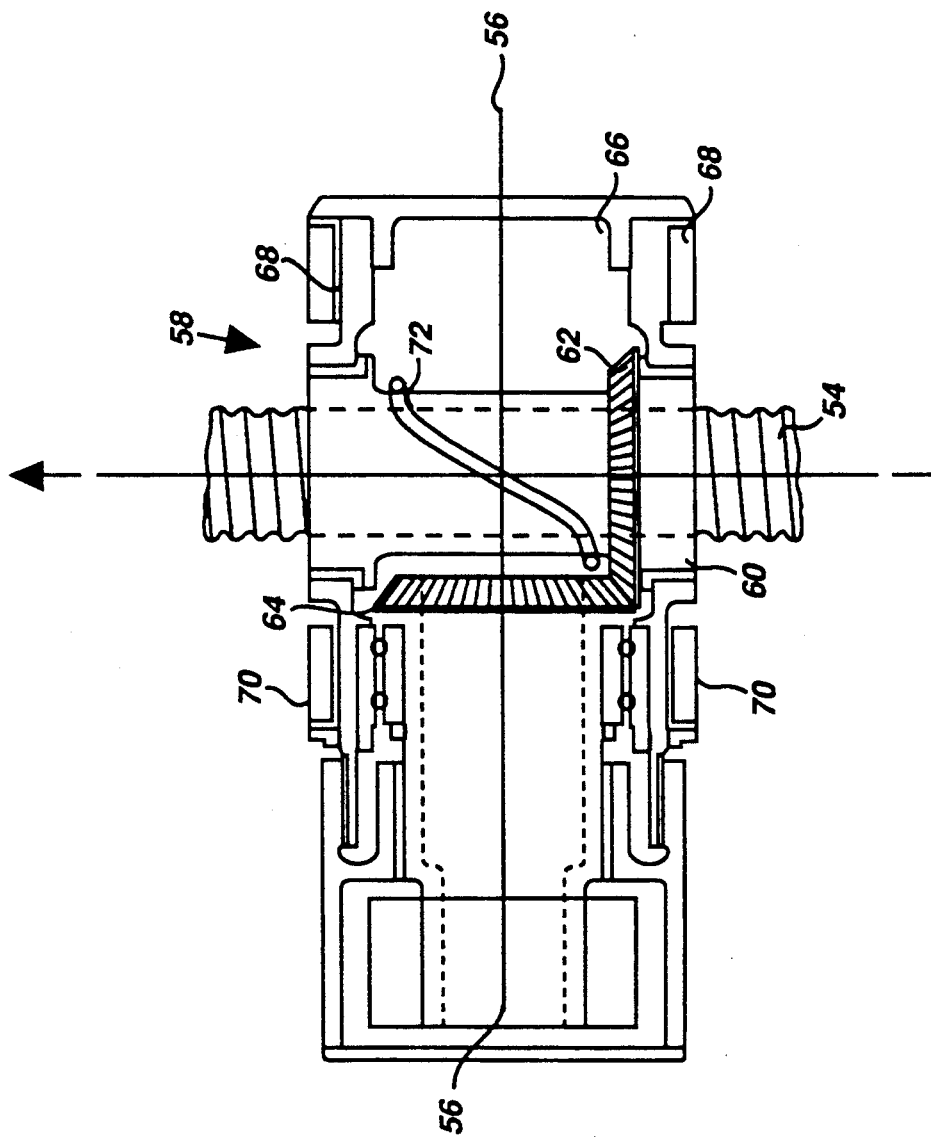
FIG. 8 is a side elevational view of the driving motor and gears of the ramp actuator.

Preferably, the mechanical actuators 39 take up a small amount of space and have a small weight while providing the desired range of movement. Many different mechanical actuators could be used to move the ramp 34. For example, electric motors, hydraulic pistons or the like could be used to provide a telescoping member, rigid rotating member or linearly extending member if desired. One known suitable actuator 39 is a ball screw assembly 58, as shown in FIGS. 6–8. The mechanical actuator 39 is supported within the wing structure 28 between an upper wing surface 31 and the lower wing surface 30. The ball screw assembly 58 is supported between wing spar cords on a support member 74. A drive shaft 76 extends across the width of the ramp to drive each of the ball screw assemblies in the same row position of the ramp in synchronism. The ball screw assembly 58 includes a threaded screw member 54 coupled at on end thereof to the beam 46 and pivoting about an axis 56, perpendicular the direction of movement of the screw 54 through the ball screw assembly 58. The screw 54 is driven forward by rotatable bushing 60 having internal threads mating with the threads of screw member 54. The bushing 60 includes a bevel gear 62 driven by a bevel gear 64 coupled to the drive shaft 76 of an actuator motor. The housing 66 of the ball screw actuator 58 includes bearing bushings 68 and 70 to permit the ball screw 58 to pivot about axis 56, as shown in FIG. 8. Recirculating ball bearings 72 are provided in the bearing screw assembly to permit smoother motion of the screw 54, with less force exerted by the motor through bevel gear 64. The ball screw is mounted to pivot freely about axis 56; however, if desired, an independent drive motor is provided to drive the ball screw assembly 58 to particular angular positions about axis 56 in addition to the drive motor for driving the screw 54 backwards and forwards.

The motion of the ball screw assembly and screw is illustrated in FIGS. 6 and 7. The undriven position of the screw 54 is the intermediate position 40 between the minimum position 36 and the maximum position 38. In this position, the ramp is not deformed. Each of the four actuators in a column, coupled to a single beam may be independently driven to shape the ramp assembly 32 in any desired shape. Preferably, each of the actuators in a row are driven by a common shaft 76 to ensure that the ramp assembly 32 moves uniformly across its width. The screw 54 is pivotally coupled to the beam member 46, as shown in FIGS. 2, 3, and 7. Rotating the bevel gear 62 to rotate the screw 54 in a clockwise direction threads the screw 54 through the ball screw joint, shortens the distance between the ball screw assembly and the end 55 coupled to the beam 46 and brings the beam 46 upward, which increases the inlet area or, alternatively, creates a local concave surface at that region. As the distal end 57 of screw 54 extends outward from the ball joint, the ball screw assembly 58 rotates about axis 56 to position the screw 54 generally parallel with the wing surface 30. Pivoting the ball screw assembly 58 about axis 56 prevents the distal end 57 of screw 54 from projecting through the upper surface 31 of wing 30. If the inlet area 24 is to be decreased, the gear 62 is driven counterclockwise to extend the screw 54. As the screw 54 extends, the ball screw assembly 58 pivots about axis 56. Further, the distal end 57 of the screw 54 advances towards the ball screw assembly 58 as the bevel gear 62 is rotated counterclockwise. As the ball screw assembly 58 is pivoted clockwise about axis 56 to decrease the inlet area, the distal end 57 of screw 54 moves forward, preventing the screw 54 from striking the upper surface 31 of wing 28. While any suitable actuator may be used to provide the mechanical force for deforming and shaping the ramp skin 34, a ball screw assembly is an advantageous way to provide the required actuator force in a compact environment, for example, within the wing structure 28.

Figure 12:
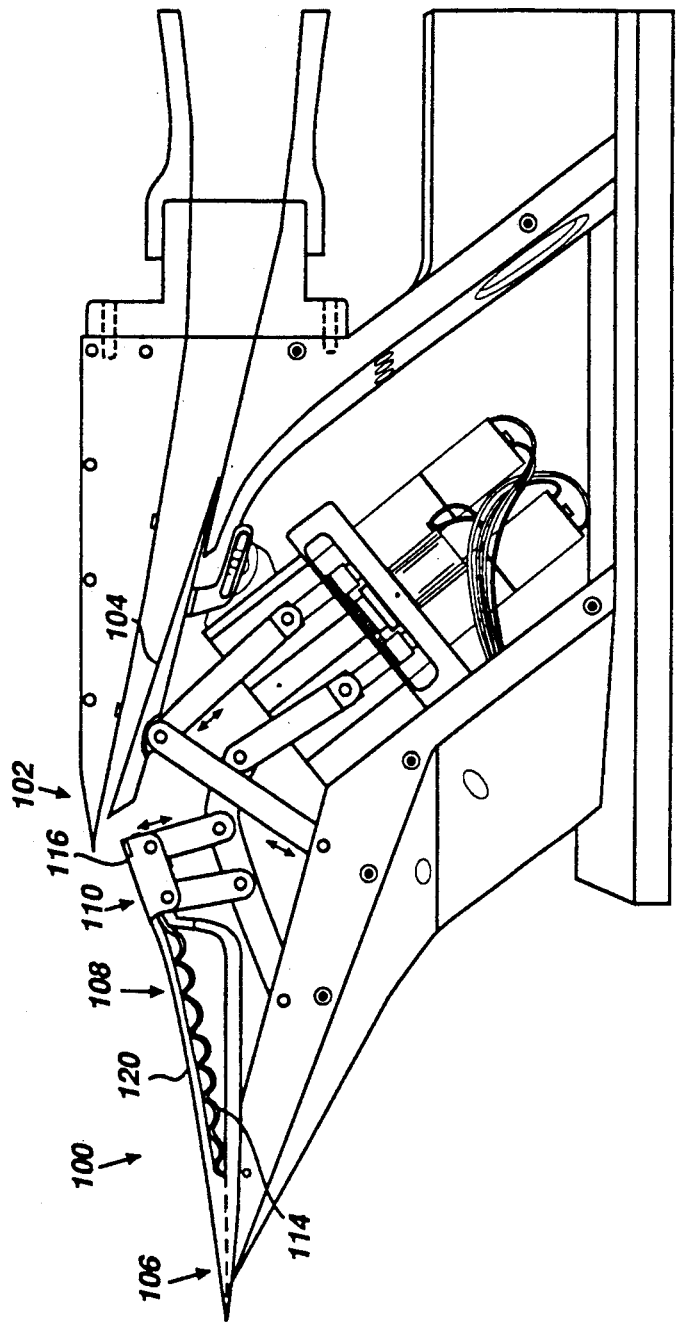
FIG. 12 is a cross-sectional view of an alternative embodiment of the inlet and a mechanical actuator.

Alternative to using the invention ramp assembly on an aircraft designed to travel at Mach 25, the single-piece flexible inlet ramp assembly can be part of a conventional aircraft and a conventional inlet structure, as shown in FIGS. 11 and 12. The inlet of FIGS. 11 and 12 is for an aircraft having an operating speed in the range of Mach 2-6. The inlet includes forward ramp 100, cowl 102, and internal ramp 104. The forward ramp includes ramp members 106, 108 and 110. Ramp assembly 108 is a single-piece, flexible inlet ramp incorporating the features and advantages of ramp assembly 32, as previously described. The ramp assembly 108 is pivotally coupled to the leading edge 106 at hinge 107. Alternatively, (he forward ramp 100 includes a single, continuous ramp skin, as shown in FIG. 12.

Ramp members 108 and 110, as shown in FIG. 11, are deformed by suitable mechanical actuators 112, similar to the type described with respect to ramp assembly 32 and shown in FIGS. 6-8. Alternatively, as shown in FIG. 12, the mechanical actuator may include pistons in an hydraulic cylinder, an electric motor driving a screw through a series of gears and coupled to a lever arm and the like, to deform the ramp 108 to the desired shape. The actuators may be coupled to a rigid ramp member 116 separated from the corrugated backing member 114, rather than to the flexible ramp 108.

The single piece, flexible ramp assembly 108 includes a corrugated interior member 114 having ridges and grooves to provide support to skin member 120. The corrugated member 114 is rigidly coupled at the grooves to the interior of the skin member 120. Beam members extending perpendicular to the ridges and grooves are not required in the embodiment of FIG. 12 because the width of the ramp assembly 108 is more narrow than for the other embodiments and the mechanical actuators are coupled at the rear of the ramp. Preferably, the skin member 120 is shaped to provide the desired airflow at an intermediate speed when not deformed and may be deformed in either direction, depending on the aircraft flight conditions, as described with respect to the ramp assembly 32.

The invention has been described with respect to particular embodiments for realizing a single-piece, flexible inlet ramp. The equivalent structures which operate to provide the same result will be apparent to those of ordinary skill in the art and fall within the scope of this invention.

We claim:

1. An inlet ramp for an aircraft engine, comprising:
 a skin member formed in a predetermined shape to form an inlet ramp for said aircraft engine, said predetermined shape, when not deformed, corresponding to a desired shape at an intermediate speed of an aircraft;
 a corrugated member having ridges and grooves, said corrugated member being rigidly coupled to said skin member;
 a beam member coupled to said skin member and extending perpendicular to said ridges and grooves; and
 a plurality of actuators coupled to said beam member for applying force to deform said skin member to vary the shape of said inlet ramp, said beam members being deformed to increase the area of said inlet and said beam members being formed to decrease the area of said inlet.

2. The inlet ramp according to claim 1 wherein said corrugated member is rigidly coupled to said skin member only at each of said grooves.

3. The inlet ramp according to claim 1 wherein said corrugated member is free-standing at a plurality of ridges.

4. The inlet ramp according to claim 1 wherein said corrugated member extends under said beam member.

5. The inlet ramp according to claim 1 wherein said inlet ramp includes a plurality of ramp members coupled to each other, one of said ramp members having a corrugated member coupled to an interior surface.

6. The inlet ramp according to claim 1 wherein said actuator is a ball screw actuator.

7. The inlet ramp according to claim 1 wherein said skin member is a single integral member.

8. The inlet ramp according to claim 1 wherein said skin member forms a portion of the underside of an aircraft wing structure.

9. The inlet ramp according to claim 5 wherein said beam members are I-beams.

10. An inlet for an aircraft engine comprising:
a cowl;
a ramp assembly having a single, continuous, flexible skin member, when not deformed, being formed in a selected shape corresponding to an intermediate speed of an aircraft; and
a plurality of actuator means coupled to said ramp assembly for elastically deforming said skin member in a first direction to increase the area of inlet and in a second direction to decrease the area of said inlet.

11. The inlet according to claim 10 wherein a plurality of said actuators are drivable independent of each other.

12. The inlet according to claim 10 wherein a plurality of said actuators are drivable in synchronous with each other.

13. The inlet according to claim 10, further including a ramp assembly having a rigid skin member coupled to said ramp assembly having a flexible skin member.

14. The inlet according to claim 10 wherein said actuator includes a threaded screw shaft driven by a rotatable gear.

15. The inlet according to claim 10 wherein said actuator includes a piston.

16. The inlet according to claim 10, further including a corrugated member coupled to said skin member for permitting said skin member to easily deform in one direction but providing stiffening support in a second direction, said corrugated member deforming as said skin member deforms.

17. The inlet according to claim 10 wherein said skin member is deformed to increase the inlet area and to decrease the inlet area.

18. The method of varying the inlet area to an aircraft engine comprising:
forming a ramp member in a predetermined shape corresponding to an intermediate speed of said aircraft, said ramp member having minimum internal stress in said predetermined shape;
deforming said ramp member in a first direction to increase said inlet area, said deforming increasing the internal stress in said ramp member; and
deforming said ramp member in a second direction to decrease said inlet area, said deforming increasing the internal stress in said ramp member.

19. The method according to claim 18 wherein said step of forming a ramp includes:
forming a beam member in a predetermined shape;
forming a skin member in a predetermined shape; and
coupling said beam member to said skin member.

20. The method according to claim 19, further including:
coupling a corrugated member having grooves and ridges to said skin member, said coupling occurring only at the grooves of said corrugated member.

21. The method according to claim 18 wherein said deforming steps include varying the effective length of an actuating rod which is coupled to said ramp.

22. The method according to claim 18 wherein said inlet is at a minimum size when said aircraft is moving at a maximum speed.

23. The method according to claim 19 wherein said skin is a single integral member.

24. An inlet ramp for an aircraft engine, comprising:
a single piece, flexible skin member forming a surface of said inlet ramp;
a deformable, flexible, corrugated member having ridges and grooves, said corrugated member being rigidly coupled to said skin member at said grooves and being freestanding at said ridges; and
a plurality of actuator means coupled to said skin member for deforming said skin member and said corrugated member to vary the shape of said inlet ramp, said corrugated member being deformed when said skin member is deformed.

25. The inlet ramp according to claim 24 wherein said entire inlet ramp is a single, continuous sheet.

* * * * *